United States Patent
Connor et al.

(10) Patent No.: US 8,206,871 B2
(45) Date of Patent: Jun. 26, 2012

(54) INSULATING LAYER FOR A FUEL CELL ASSEMBLY

(75) Inventors: Eric J. Connor, Rochester, NY (US); Daniel P. Miller, Victor, NY (US); Wenbin Gu, Pittsford, NY (US); Jeanette E. Owejan, Honeoye, NY (US); Mark Mathias, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 397 days.

(21) Appl. No.: 12/500,661

(22) Filed: Jul. 10, 2009

(65) Prior Publication Data

US 2011/0008702 A1    Jan. 13, 2011

(51) Int. Cl.
*H01M 8/10* (2006.01)
*H01M 8/04* (2006.01)

(52) U.S. Cl. ........ 429/465; 429/479; 429/483; 429/452; 429/468

(58) Field of Classification Search .......................... None
See application file for complete search history.

(56) References Cited

U.S. PATENT DOCUMENTS

| | | | |
|---|---|---|---|
| 6,866,954 B2 * | 3/2005 | Hayashi et al. | 429/461 |
| 6,953,632 B2 | 10/2005 | Hayashi et al. | |
| 7,014,935 B2 | 3/2006 | Knights et al. | |
| 7,160,640 B2 * | 1/2007 | Houlberg | 429/434 |
| 7,163,760 B2 * | 1/2007 | Tanaka et al. | 429/413 |
| 7,201,981 B2 | 4/2007 | Enjoji et al. | |
| 2004/0247967 A1 * | 12/2004 | Resnick et al. | 429/26 |

* cited by examiner

*Primary Examiner* — Barbara Gilliam
*Assistant Examiner* — Angela Martin
(74) *Attorney, Agent, or Firm* — Fraser Clemens Martin & Miller LLC; J. Douglas Miller

(57) ABSTRACT

A fuel cell assembly is disclosed, the fuel cell assembly including a pair of terminal plates, one terminal plate disposed at each end of the fuel cell assembly, a fuel cell disposed between a pair of end fuel cells and the terminal plates, and a thermally insulating, electrically conductive layer formed between the fuel cell and one of the terminal plates adapted to mitigate thermal losses from the end plate, and fluid condensation and ice formation in an end fuel cell. The end fuel cells of the fuel cell assembly have a membrane and/or a cathode having a thickness greater than an average thickness of a membrane and/or a cathode disposed in the fuel cell that may be used in conjunction with, or instead of, the insulating layer to further mitigate thermal losses from the end plate, and fluid condensation and ice formation in the end fuel cells.

19 Claims, 4 Drawing Sheets

INSULATING LAYER FOR A FUEL CELL ASSEMBLY

FIELD OF THE INVENTION

The invention relates to a fuel cell assembly, and more specifically to a fuel cell assembly having a thermally insulating, electrically conducting layer disposed between a terminal plate and an end plate thereof to mitigate thermal losses from the end plate, and fluid condensation and ice formation in an end fuel cell. The fuel cell assembly may also include membranes and/or cathodes having a thickness greater than the thickness of the membranes and/or cathodes used in most of the fuel cells of the fuel cell assembly. These membranes and/or cathodes may be used in the end fuel cells in conjunction with or instead of the insulating layer to further mitigate thermal losses from the end plate, and fluid condensation and ice formation in the end fuel cells.

BACKGROUND OF THE INVENTION

Fuel cell assemblies convert a fuel and an oxidant to electricity. One type of fuel cell power system employs a proton exchange membrane (hereinafter "PEM") to separate electrodes that facilitate catalytic reaction of fuels (such as hydrogen) and oxidants (such as air or oxygen) to generate electricity. The PEM is typically a solid polymer electrolyte membrane that facilitates transfer of protons from an anode to a cathode in each individual fuel cell normally deployed in a fuel cell power system. A typical PEM for automotive application is 15-25 microns thick.

In a typical fuel cell assembly (or stack) within a fuel cell power system, individual fuel cell plates include channels through which various reactants and cooling fluids flow. Fuel cell plates are typically designed with straight or serpentine flow channels. Such flow channels are desirable as they effectively distribute reactants over an active area of an operating fuel cell, thereby maximizing performance and stability. In subzero temperatures, water vapor in the fuel cell assembly may condense. Further, the condensate may form ice in the fuel cell assembly. The presence of condensate and ice may affect the performance of the fuel cell assembly.

During typical operating conditions, condensate may also accumulate at the edges of the fuel cell plates adjacent outlet manifolds of the fuel cell assembly, thereby restricting fluid flow from the flow channels to the outlet manifolds. During a starting operation of the fuel cell assembly in subzero temperatures, the condensed water in the flow channels of the fuel cell plates and at the edges of the outlet manifolds is in the form of ice which may restrict reactant flow. Similarly, reactant flow maldistribution due to liquid water stagnation during normal operation can result.

Typically, to mitigate the formation of condensation at the outlet manifolds of the fuel cell assembly, the operating temperature of the fuel cell assembly is increased. However, increasing the operating temperature may have a negative impact on ohmic resistance due to increased membrane proton resistance as a result of decreased membrane humidification. Also, decreasing the inlet relative humidity of anode and cathode gas streams will achieve the same effect as increasing the operating temperature and result in a negative impact on ohmic resistance due to increased membrane proton resistance.

During operation of the fuel cell assembly, waste heat from the fuel cell reaction heats the fuel cell assembly and mitigates water condensation and ice formation in the assembly. However, end plates of the fuel cell assembly tend to have a temperature lower than the temperature of intermediate plates of the fuel cell assembly. The end plates have a lower temperature due to thermal losses to the environment and thermal losses to terminal plates of the fuel cell assembly adjacent thereto. A difference in the temperature of the fuel cell plates throughout the fuel cell assembly may result in inefficient operation, maldistribution of reactants, condensation of water which may lead to ice formation, and a decreased useful life of the fuel cell assembly.

Typically, to ensure a substantially uniform temperature distribution between the plates in the fuel cell assembly, a heating mechanism is disposed adjacent the end plates to directly transfer thermal energy thereto. A heating mechanism may also be disposed adjacent the terminal plates to transfer thermal energy thereto. Thermal energy is then transferred from the terminal plates to the end plates. Alternatively, a resistive heating mechanism adapted to heat the end plates may be connected in parallel to the fuel cell assembly. If a heating mechanism fails and is in a powered state, the end fuel cells may dry out, thereby leading to an electrical short in the fuel cell assembly. Other methods for heating the end plates include catalytic heating, and providing a bypass plate disposed between the end plates and the terminal plates.

It would be desirable to develop a fuel cell assembly having a thermally insulating, electrically conducting layer disposed between a terminal plate and an end plate thereof to mitigate thermal losses from the end plate, and fluid condensation and ice formation on the end plate, and having end fuel cells with membranes and/or cathodes having a thickness greater than an average thickness of the membranes and cathodes used in the fuel cells in the remainder of the fuel cell assembly to further mitigate thermal losses from the end plate, and fluid condensation and ice formation in the end fuel cells.

SUMMARY OF THE INVENTION

Concordant and congruous with the present invention, a fuel cell assembly having a thermally insulating, electrically conducting layer disposed between a terminal plate and an end plate thereof to mitigate thermal losses from the end plate, and fluid condensation and ice formation on the end plate, has surprisingly been discovered.

In one embodiment, the fuel cell assembly comprises a plurality of fuel cells arranged in a stack; a first terminal plate disposed at a first end of the stack of the fuel cells; a second terminal plate disposed at a second end of the stack of the fuel cells; and an insulating layer disposed between one of the fuel cells and the first terminal plate to provide a thermal barrier therebetween.

In another embodiment, the fuel cell assembly comprises a pair of terminal plates, one of the terminal plates disposed at each end of the fuel cell assembly; a pair of end fuel cells disposed between the terminal plates, each of the end fuel cells having an electrolyte membrane disposed therein; a plurality of fuel cells arranged in a stack and disposed between the end fuel cells, each of the fuel cells including an electrolyte membrane disposed therein, wherein the electrolyte membranes disposed in the end fuel cells have a thickness of at least about 1.5 times an average thickness of the electrolyte membranes disposed in the fuel cells; and an insulating layer disposed between the fuel cells and at least one of the terminal plates to provide a thermal barrier therebetween.

In another embodiment, the fuel cell assembly comprises a pair of terminal plates, one of the terminal plates disposed at each end of the fuel cell assembly; a pair of end fuel cells disposed between the terminal plates, each of the end fuel cells having a cathode disposed therein; a plurality of fuel cells arranged in a stack and disposed between the end fuel cells, each of the fuel cells having a cathode disposed therein, wherein the cathodes disposed in the end fuel cells have a thickness of at least about 1.5 times an average thickness of the cathodes disposed in the fuel cells; and an insulating layer disposed between the fuel cells and at least one of the terminal plates to provide a thermal barrier therebetween.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
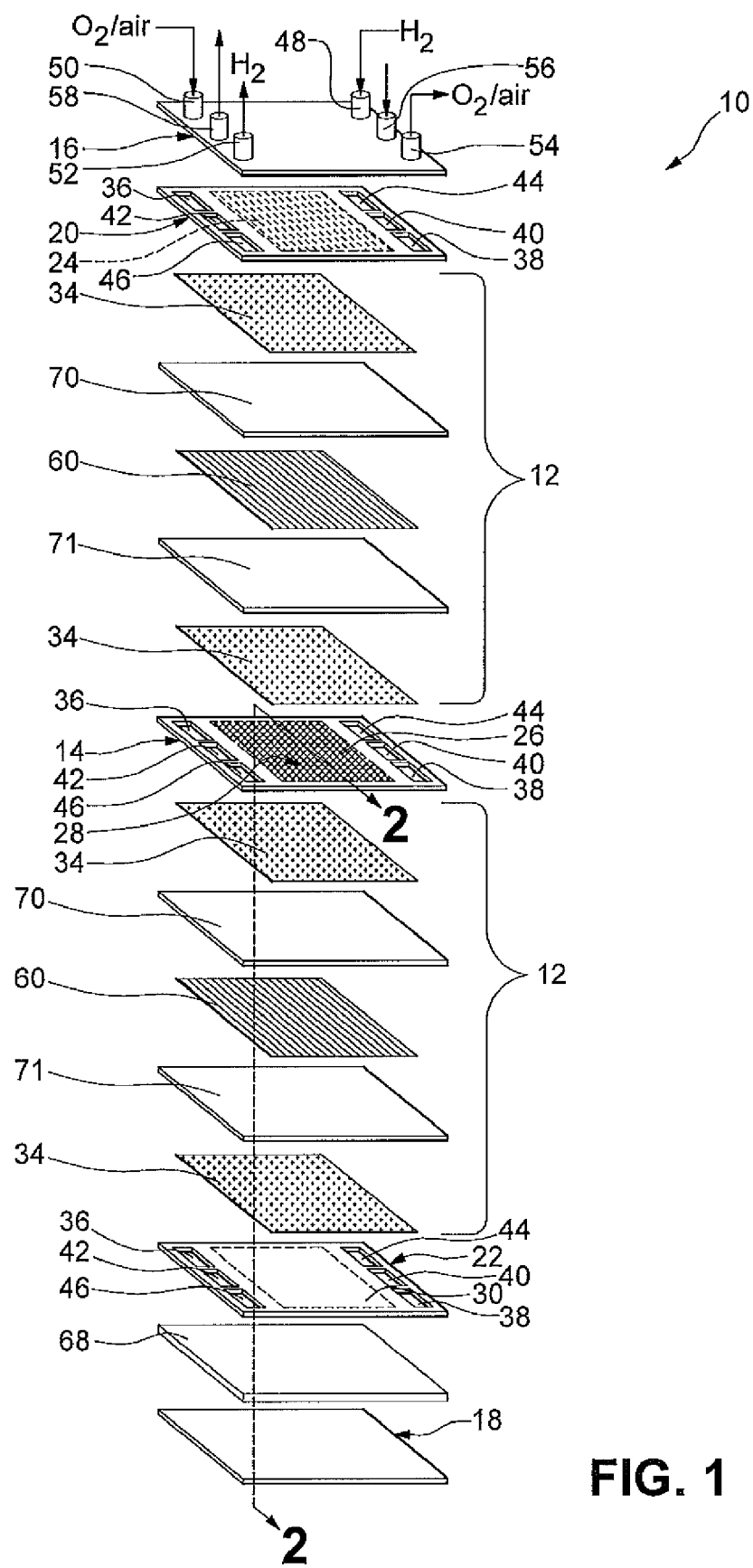
FIG. 1 is an exploded perspective view of a fuel cell stack according to an embodiment of the invention.

FIG. 1 depicts a fuel cell assembly 10 having a two fuel cell stack. The fuel cell assembly is a proton exchange membrane (PEM) fuel cell assembly. Each of the two fuel cells includes a unitized electrode assembly (UEA) 12. The UEAs 12 are separated from each other by an electrically conductive bipolar plate 14. The UEAs 12 have anode and cathode diffusion media (DM) 34, anode 70 and cathode 71 electrodes, and an electrolyte membrane 60. For simplicity, a fuel cell assembly 10 with a two-cell fuel cell stack (i.e. one bipolar plate) is illustrated and described in FIG. 1, it being understood that a typical fuel cell assembly has many more such fuel cells and bipolar plates.

The UEAs 12 and bipolar plate 14 are stacked together between a pair of terminal plates 16, 18 and a pair of unipolar end plates 20, 22. The unipolar end plate 20, both working faces of the bipolar plate 14, and the unipolar end plate 22 include respective active areas 24, 26, 28, 30. The active areas 24, 26, 28, 30 typically contain flow fields for distributing gaseous reactants such as hydrogen gas and air over an anode and a cathode, respectively, of the UEAs 12.

The bipolar plate 14 is typically formed by a conventional process for shaping sheet metal such as stamping, machining, molding, or photo etching through a photolithographic mask, for example. In one embodiment, the bipolar plate 14 is formed from unipolar plates which are then joined by any conventional process such as welding or adhesion. It should be further understood that the bipolar plate 14 may also be formed from a composite material. In one particular embodiment, the bipolar plate 14 is formed from a graphite or graphite-filled polymer. Gas-permeable diffusion media 34 are disposed adjacent the both sides of the bipolar plate 14. The end plates 20, 22 are also disposed adjacent the diffusion media 34. In the embodiment shown in FIGS. 1 and 2, an insulating layer 68 is disposed between the end plate 22 and the terminal plate 18. The insulating layer 68 is an electrically conductive, thermally insulating layer, such as a carbon foam, a carbon cloth, or a carbon paper, for example. Favorable results have been obtained with an insulating layer 68 having a thickness between about 2 mm and about 6 mm, however, the insulating layer 68 may have any thickness, as desired. It is understood that a second insulating layer may be disposed between the unipolar plate 20 and the terminal plate 16, as desired.

The bipolar plate 14, unipolar end plates 20, 22, and the UEAs 12 each include a cathode supply aperture 36 and a cathode exhaust aperture 38, a coolant supply aperture 40 and a coolant exhaust aperture 42, and an anode supply aperture 44 and an anode exhaust aperture 46. Supply manifolds and exhaust manifolds of the fuel cell assembly 10 are formed by an alignment of the respective apertures 36, 38, 40, 42, 44, 46 in the bipolar plate 14, unipolar end plates 20, 22, and the UEAs 12. The hydrogen gas is supplied to an anode supply manifold via an anode inlet conduit 48. The air is supplied to a cathode supply manifold of the fuel cell assembly 10 via a cathode inlet conduit 50. An anode outlet conduit 52 and a cathode outlet conduit 54 are also provided for an anode exhaust manifold and a cathode exhaust manifold, respectively. A coolant inlet conduit 56 is provided for supplying liquid coolant to a coolant supply manifold. A coolant outlet conduit 58 is provided for removing coolant from a coolant exhaust manifold. It should be understood that the configurations of the various inlets 48, 50, 56 and outlets 52, 54, 58 in FIG. 1 are for the purpose of illustration, and other configurations may be chosen as desired.

Figure 2:
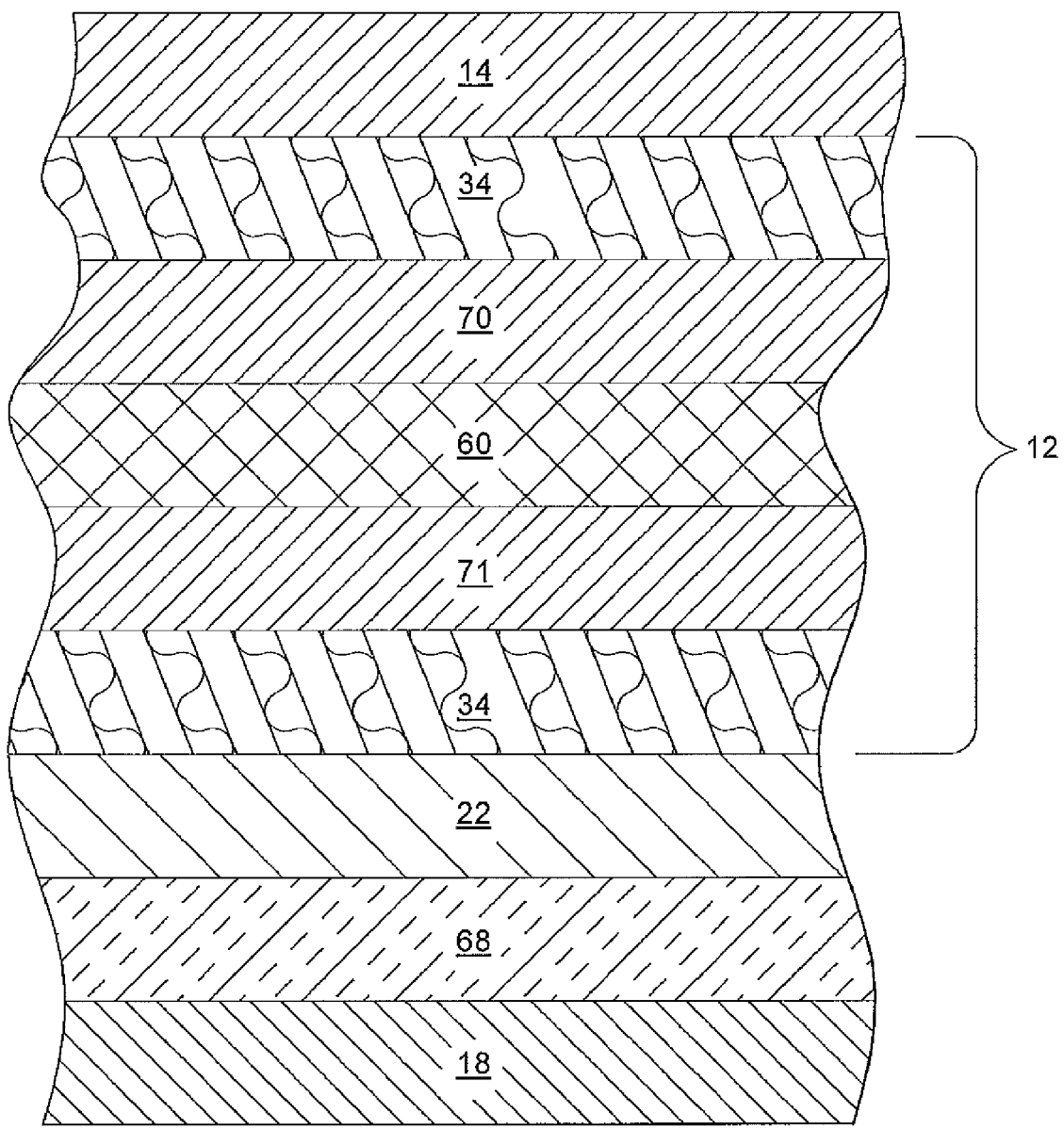
FIG. 2 is a fragmentary side, cross-sectional view of a portion of the fuel cell assembly shown in FIG. 1 taken along line 2-2.

UEAs 12 for use in the fuel cell assembly may include a plurality of components. As shown in FIG. 2, the UEA 12 includes an electrolyte membrane 60, an anode 70, a cathode 71, and the diffusion media 34. The components of the UEA 12 are assembled during production of the UEA 12 and affixed to one another by any conventional process such as hot pressing, for example. An adhesive may be used between individual components, as desired. For clarity, the diffusion media 34 and electrolyte membrane 60 in FIG. 1 have been linearly displaced to show the electrolyte membrane 60.

The anode 70 and the cathode 71 of the fuel cell assembly 10 may be disposed on the electrolyte membrane 60 and/or the diffusion media 34. The electrode may be formed by a catalyst ink applied to the components by any conventional process such as spraying, dipping, brushing, roller transfer, slot die coating, gravure coating, Meyer rod coating, decal transfer, and printing, for example. Either the anode or the cathode can be referred to as an electrode.

The electrolyte membrane 60 may be a membrane layer formed from an ionomer. The ionomer perfluorosulfonic acid (PFSA) such as sold under the trademark Nafion® NRE211, is a typical ionomer well known in the art for use as the electrolyte membrane 60 of a fuel cell. The electrolyte membrane 60 is disposed between the anode 70 and the cathode 71.

Generally, during operation of a fuel cell power system, a stream of hydrogen is fed into the anode side of the fuel cell assembly 10. Concurrently, a stream of oxygen is fed into the cathode side of the fuel cell assembly 10. On the anode side, the hydrogen in the hydrogen stream is catalytically split into protons and electrons. The oxidation half-cell reaction is represented by: $H_2 \leftrightarrow 2H^+ + 2e^-$. In a PEM fuel cell, the protons permeate through the membrane to the cathode side. The electrons travel along an external load circuit to the cathode side creating the current of electricity of the fuel cell assembly 10. On the cathode side, the oxygen in the oxidant stream combines with the protons permeating through the membrane and the electrons from the external circuit to form water molecules. This reduction half-cell reaction is represented by: $4H^+ + 4e^- + O_2 \leftrightarrow 2H_2O$. Anode exhaust from the anode side is typically recirculated through the system to maintain high anode conversion to electricity and low hydrogen emissions.

Cathode exhaust from the cathode side is exhausted to atmosphere. A control module (not shown) regulates the conditions of the hydrogen stream, oxygen stream, and exhaust streams by operating various control valves (not shown), and compressors (not shown) in response to signals from pressure sensors (not shown) and electrical power sensors (not shown) connected to the fuel cell assembly 10. One exemplary exhaust system is disclosed in commonly-owned U.S. Pat. No. 7,235,318 for FUEL CELL SYSTEM BACK-PRESSURE CONTROL WITH A DISCRETE VALVE, hereby incorporated herein by reference in its entirety.

When the fuel cell assembly 10 is in operation, the insulating layer 68 mitigates a loss of thermal energy from the end plate 22 to the environment, and from the end plate 22 to the terminal plate 18. Because the thermal energy of the end plate 22 is conserved, a temperature of the end plate 22 is maximized during all operational modes, especially during a start-up operation of the fuel cell assembly 10 in cold temperatures. By maximizing the temperature of the end plate 22 during typical operation, liquid water formed from condensed water vapor in the channels of the end plate 22 is minimized. Similarly, because condensation is minimized, the formation of ice in the channels of the end plate 22 in cold conditions is also minimized, thereby facilitating efficient cold start-up of the fuel cell assembly 10. Additionally, by maximizing the temperature of the end plate 22 during start-up of the fuel cell system from cold temperatures, formation of liquid water or ice within the anode 70 and the cathode 71 is minimized, thereby facilitating efficient cold start-up of the fuel cell assembly. An undesired increase in the thermal energy generation due to electrical resistance of the insulating layer 68 may be compensated for by an amount of the coolant flow through the fuel cell assembly 10. By conserving the thermal energy of the end plate 22, a heating mechanism is not required to heat the end plate 22, thereby minimizing the complexity and cost of the fuel cell assembly 10.

Figure 3:
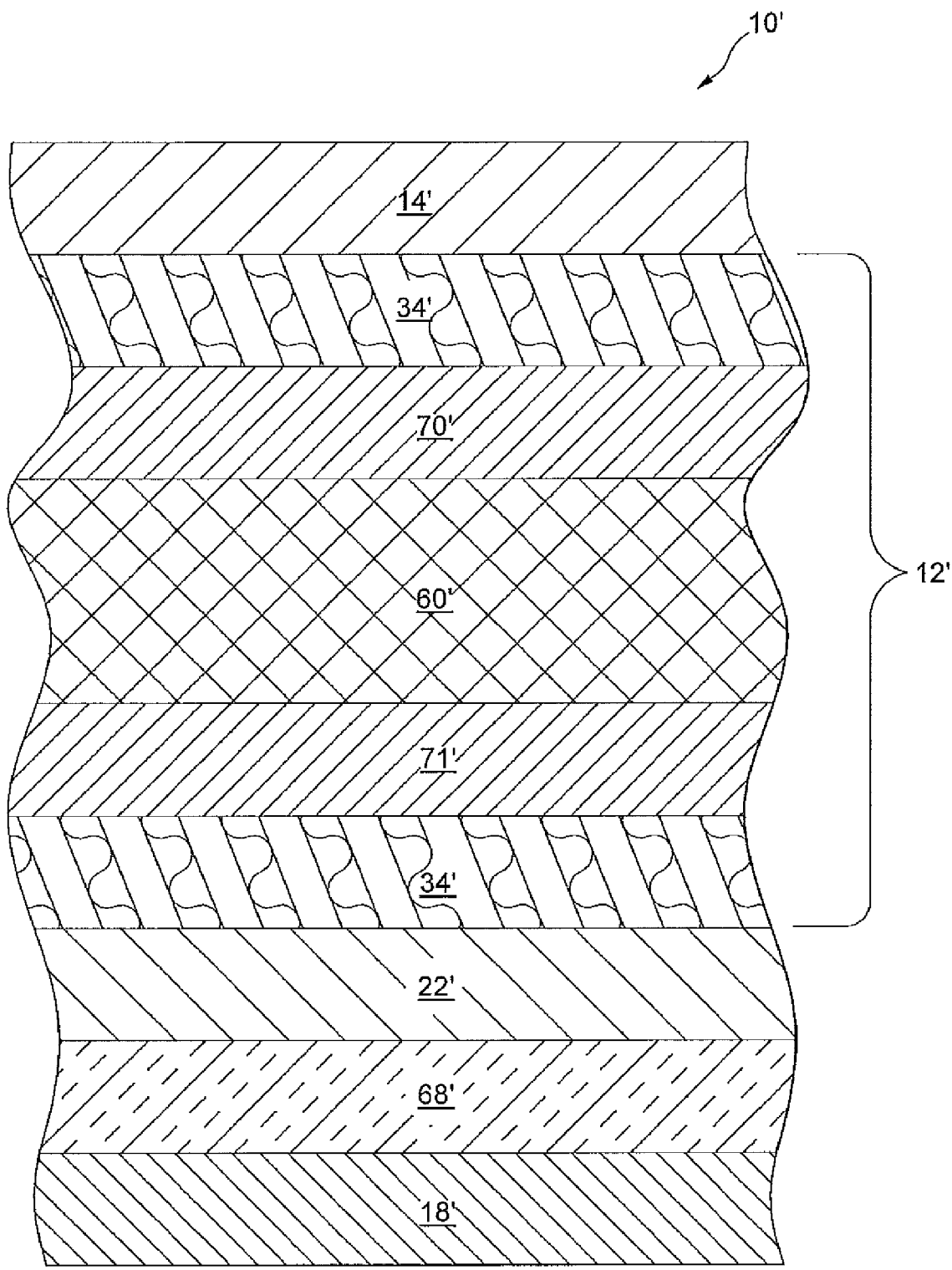
FIG. 3 is a fragmentary side, cross-sectional view of a portion of a fuel cell assembly according to another embodiment of the invention.

FIG. 3 shows a portion of a fuel cell assembly 10' according to an embodiment of the invention similar to the fuel cell assembly 10 of FIGS. 1 and 2 except as described below. The fuel cell assembly 10' includes a plurality of fuel cells in a stack. Like structure repeated from FIGS. 1 and 2, FIG. 3 includes the same reference numerals and a prime symbol ('). The portion of the fuel cell assembly 10' includes a UEA 12' including a membrane 60' disposed between an anode 70' and a cathode 71' and a plurality of diffusion media 34'. The UEA 12' is disposed between a bipolar plate 14' and an end plate 22'. An insulating layer 68' is disposed between the end plate 22' and a terminal plate 18'.

In the embodiment shown in FIG. 3, the membrane 60' of the fuel cell adjacent to the terminal plate 18' (the end fuel cell) is a membrane layer formed from an ionomer. The ionomer perfluorosulfonic acid (PFSA) such as sold under the trademark Nafion® NRE211, is a typical ionomer well known in the art for use as the electrolyte membrane 60' of a fuel cell. The electrolyte membrane 60' is disposed between the anode 70' and the cathode 71'. The end fuel cell membrane 60' has a thickness greater than from about 1.2 times to about 1.5 times the average thickness of other membranes of the fuel cell assembly 10'; however, the end fuel membrane 60' may have any thickness, as desired. The membranes used in the other fuel cells have a thickness less than 25 microns. It is understood that one or more of the fuel cells adjacent to the end fuels of the fuel cell assembly 10' may include membranes 60' having a thickness greater than from about 1.2 times to about 1.5 times the average thickness of other membranes of the fuel cell assembly 10'. Favorable results have been received with a membrane 60' having a thickness of 25-35 microns.

When the fuel cell assembly 10' is in operation, the insulating layer 68' mitigates a loss of thermal energy from the end plate 22' to the environment, and from the end plate 22' to the terminal plate 18'. Because the loss of thermal energy from the end plate 22' is minimized, a temperature of the end plate 22' is maximized. By maximizing the temperature of the end plate 22', liquid water formed from condensed water vapor in the channels of the end plate 22' is minimized. Similarly, because condensation is minimized, the formation of ice in the channels of the end plate 22' in cold conditions is also minimized, thereby facilitating efficient cold start-up of the fuel cell assembly 10. Additionally, by maximizing the temperature of the end plate 22 during a start-up operation of the fuel cell assembly 10 in cold temperatures, formation of liquid water or ice within the anode 70' and the cathode 71' is minimized, thereby facilitating efficient cold start-up of the fuel cell assembly 10'. Because the membrane 60' of the end fuel has a thickness greater than a typical fuel cell membrane, an amount of condensation absorbed by the membrane 60' is maximized, thereby further minimizing the condensation formed in the anode 70' and the cathode 71' and the flow channels of the end plate 22'. An undesired increase in the thermal energy generation due to the protonic resistance of the thicker membrane 60' and the electrical resistance of the insulating layer 68' may be compensated for by an amount of the coolant flow through the fuel cell assembly 10'. By conserving the thermal energy of the end plate 22', a heating mechanism is not required to heat the end plate 22', thereby minimizing the complexity and cost of the fuel cell assembly 10'.

Figure 4:
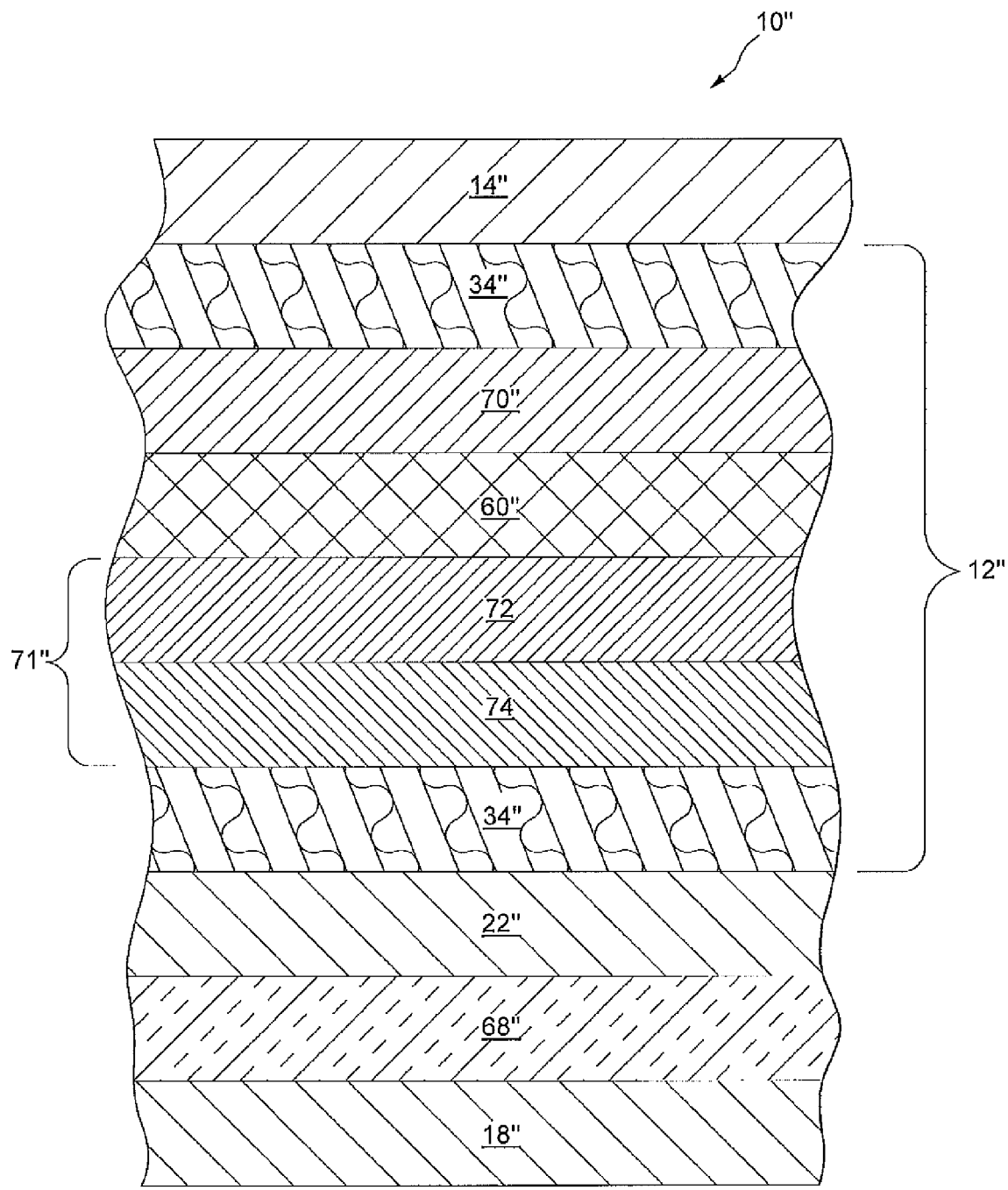
FIG. 4 is a fragmentary side, cross-sectional view of a portion of a fuel cell assembly according to another embodiment of the invention.

FIG. 4 shows a portion of a fuel cell assembly 10" according to an embodiment of the invention similar to the fuel cell assembly 10 of FIGS. 1 and 2 except as described below. The fuel cell assembly 10" includes a plurality of fuel cells in a stack. Like structure repeated from FIGS. 1 and 2, FIG. 4 includes the same reference numerals and a double prime symbol ("). The portion of the fuel cell assembly 10" is a fuel cell adjacent to a terminal plate 18', known as the end fuel. The end fuel includes a UEA 12" including a membrane 60" disposed intermediate an anode 70" and a cathode 71" having a first layer 74 and a second layer 72. The cathode 71" may be formed from a single layer, as desired. Whether formed from a single layer or the first layer 74 and the second layer 72, the cathode 71" has a thickness greater than from about 1.2 times to 1.5 times the average thickness of the other cathodes of the fuel cell assembly 10"; however, the cathode 72" may have any thickness, as desired. The membrane 60", the anode 70", and the cathode 71" are disposed between a plurality of diffusion media 34'. The UEA 12" is disposed between a bipolar plate 14" and an end plate 22". An insulating layer 68" is disposed between the end plate 22" and a terminal plate 18".

The first layer 74 and the second layer 72 may be any porous and electrically conductive materials that participate in the electrochemical reaction in the fuel cell assembly 10". The first layer 74 and the second layer 72 may additionally contain any porous and electrically conductive material that does not participate in the electrochemical reaction in the fuel cell assembly 10". For example, the first layer 74 and/or the second layer 72 of the cathode 71" may include a carbonaceous material, such as at least one of carbon black, graphite, and activated carbon. A catalyst of the first layer 74 and/or second layer 72 may be formed from platinum of one of the platinum group metals including palladium, iridium, rhodium, ruthenium, and alloys thereof. Suitable alloys based on platinum and another metal such as ruthenium, for example, may be employed. The catalyst may include other alloying additions such as cobalt, chromium, tungsten, molybdenum, vanadium, iron, copper, and nickel, for example. Other suitable conductive materials may also be employed, as desired. The catalyst of the layers 72, 74 may be provided in a ratio ranging from about twenty (20) weight percent PUC to about seventy (70) weight percent Pt/C. Other suitable weight percent ratios of the catalyst of the layers 72, 74 may be selected, as desired.

The first layer 74 and/or the second layer 72 may also be formed from a combination of materials including a nonconductive reinforcing material as long as the cathode 71" remains substantially electrically conductive. The fibers may be substantially straight, branched, or fibrillated, for example. The fibers may be in the form of a highly fibrillated polymeric pulp, such as Kevlar® aramid pulps and acrylic pulps as known in the art. The fiber may include at least one of a carbon nanofiber, a carbon nanotube, a glass nanofiber, a polymeric nanofiber, and a metal oxide nanofiber. It should be appreciated that the carbon nanofibers are generally smaller in diameter than conventional continuous or milled carbon fibers (e.g., about 5 microns to about 10 microns) but larger in diameter than carbon nanotubes (e.g., about 1 nanometer to about 10 nanometers). A typical nanofiber may include Pyrograf® III carbon nanofibers produced by Applied Sciences, Inc. in Cedarville, Ohio, and a vapor-grown carbon fibers (VGCF) available from Showa Denko Carbon, Inc. in Ridgeville, S.C. The nonconductive reinforcing material may have a modified surface to increase at least one of a physical entanglement and a chemical entanglement thereof. The reinforcing material may be treated with an organosilane, such as hexamethyl disiloxane (HMDSO) tetra ethoxy silane (TEOS), hexamethyl disilazane (HMDSN), or like organosilane coatings. The nonconductive reinforcing material may further be treated to form one or more functional groups on the surface thereof, such as hydroxyl groups, carboxyl groups, aldehyde groups, amide groups, amine groups, for example, to increase the interaction of the reinforcing material with the conductive materials forming the cathode 71".

In a non-limiting example, the first layer 74 of the cathode 71" is formed from an ionomer, an electrically conductive material such as a carbon nanofiber, and a platinum catalyst. The weight ratio of ionomer to carbon in the platinum on carbon catalyst is from about 0.1 to about 0.6 (0.1-0.6:1 ionomer/carbon). The weight ratio of electrically conductive material to carbon in the first layer 74 is about 1 to 1 (1:1 electrically conductive material/carbon). The first layer 74 includes about 0.2 mg/cm$^2$ of Pt. In a non-limiting example, the second layer 72 is formed from an ionomer, an electrically conductive material, and a platinum catalyst. The weight ratio of ionomer to carbon in the platinum on carbon catalyst is from about 0.6 to about 1.8. The second layer 72 includes about 0.2 mg/cm$^2$ of Pt. Favorable results have been obtained with a second layer 72 having 1.5 ionomer/carbon weight ratio, and a first layer 74 with a 0.33 ionomer/carbon weight ratio. The cathode 71" has a thickness of about 24 microns due to each of the first layer 74 and the second layer 72 having a thickness of about 12 microns. A typical cathode has a thickness less than 20 microns. The ionomer in the first layer 74 and the second layer 72 may be any polymer that is electrically insulating and proton conducting, such as perfluorosulfonic acid (PFSA), for example. It is understood that the anode 70" may also include a first layer and a second layer similar to the first layer 74 and the second layer 72 of the cathode 71", as desired.

When the fuel cell assembly 10" is in operation, the insulating layer 68" mitigates a loss of thermal energy from the end plate 22" to the environment, and from the end plate 22" to the terminal plate 18". Because the thermal energy of the end plate 22" is conserved, a temperature of the end plate 22" is maximized. By maximizing the temperature of the end plate 22", liquid water formed from condensed water vapor in the channels of the end plate 22" is minimized. Similarly, because condensation is minimized, the formation of ice in the channels of the end plate 22" in cold conditions is also minimized, thereby facilitating efficient cold start-up of the fuel cell assembly 10". Additionally, by maximizing the temperature of the end plate 22 during start-up operation of the fuel cell assembly 10 in cold temperatures, formation of liquid water or ice within the anode 70" and the cathode 71" is minimized, thereby facilitating efficient cold start-up of the fuel cell assembly 10". Because the cathode 71" of the end fuel has a thickness greater than the cathode of a typical cathode and the cathodes in the remaining fuel cells of the fuel cell assembly 10", the amount and size or pores in the cathode 71" adapted to receive condensed water is maximized, thereby minimizing a blockage of gas flows to the catalyst in the anode 70" and the cathode 71" and minimizing the condensation formed in the flow channels of the end plate 22". By minimizing a blockage of gas flows to the catalyst in the anode 70" and the cathode 71" and minimizing the condensation formed in the flow channels, the efficiency of the fuel cell assembly 10" is increased. A possible undesired increase in the thermal energy generation due to the protonic resistance of the thicker cathode and the electrical resistance of the insulating layer 68" may be compensated for by an amount of the coolant flow through the fuel cell assembly 10". By conserving the thermal energy of the end plate 22", a heating mechanism is not required to heat the end plate 22", thereby minimizing the complexity and cost of the fuel cell assembly 10".

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:
1. A fuel cell assembly comprising:
a plurality of fuel cells arranged in a stack;
a first terminal plate disposed at a first end of the stack of said fuel cells;
a second terminal plate disposed at a second end of the stack of said fuel cells;
an insulating layer disposed between one of said fuel cells and said first terminal plate to provide a thermal barrier therebetween; and
a first end fuel cell and a second end fuel cell, said first end fuel cell disposed adjacent said first terminal plate and said second end fuel cell disposed adjacent said second terminal plate, wherein said first end fuel cell, said second end fuel cell, and said fuel cells include an electrolyte membrane disposed therein;
wherein the electrolyte membranes disposed in said first end fuel cell and said second end fuel cell have a thickness of at least about 1.2 times to about 1.5 times an average membrane thickness of the electrolyte membranes disposed in said fuel cells.

2. The fuel cell assembly of claim 1, wherein said insulating layer is formed from an electrically conductive, thermally insulating material.

3. The fuel cell assembly of claim 1, wherein said insulating layer is formed from one of a carbon foam, a carbon cloth, and a carbon paper.

4. The fuel cell assembly of claim 1, wherein said insulating layer has a thickness between about 2 mm and about 6 mm.

5. The fuel cell assembly of claim 1, further comprising a second insulating layer disposed between one of said fuel cells and said second terminal plate.

6. The fuel cell assembly of claim 1, wherein the electrolyte membranes disposed in said first end fuel cell and said second end fuel cell have a thickness of about 1.5 times an average membrane thickness of the electrolyte membranes disposed in said fuel cells.

7. The fuel cell assembly of claim 1, wherein the electrolyte membranes disposed in said first end fuel cell and said second end fuel cell have a thickness of about 25 microns to about 35 microns.

8. The fuel cell assembly of claim 1, wherein said first end fuel cell, said second end fuel cell, and said fuel cells include a cathode disposed therein.

9. The fuel cell assembly of claim 8, wherein the cathodes disposed in said first end fuel cell and said second end fuel cell have a thickness of at least about 1.2 times to about 1.5 times an average cathode thickness of the cathodes disposed in said fuel cells.

10. The fuel cell assembly of claim 8, wherein the cathodes disposed in said first end fuel cells and said second end fuel cells have a thickness of about 1.5 times an average cathode thickness of the cathodes disposed in said fuel cells.

11. The fuel cell assembly of claim 8, wherein the cathodes disposed in said first end fuel cell and said second end fuel cell have a thickness of at least about 20 microns.

12. The fuel cell assembly of claim 8, wherein the cathodes of said first end fuel cell and said second end fuel cell include a first layer and a second layer.

13. The fuel cell assembly of claim 12, wherein the first layer and the second layer of the cathodes of said first end fuel cell and said second end fuel cell are formed from a catalyst, an electrically conductive material, and an ionomer.

14. A fuel cell assembly comprising:
a pair of terminal plates, one of said terminal plates disposed at each end of the fuel cell assembly;
a pair of end fuel cells disposed between said terminal plates, each of said end fuel cells having an electrolyte membrane disposed therein;
a plurality of fuel cells arranged in a stack and disposed between said end fuel cells, each of said fuel cells including an electrolyte membrane disposed therein, wherein the electrolyte membranes disposed in said end fuel cells have a thickness of at least about 1.5 times an average thickness of the electrolyte membranes disposed in said fuel cells; and
an insulating layer disposed between said fuel cells and at least one of said terminal plates to provide a thermal barrier therebetween.

15. The fuel cell assembly of claim 14, wherein the electrolyte membranes of said end fuel cells have a thickness of about 25 microns to about 35 microns.

16. The fuel cell assembly of claim 14, wherein each of said end fuel cells and said fuel cells includes a cathode disposed therein, the cathodes disposed in said end fuel cells having a thickness of at least about 1.5 times an average thickness of the cathodes disposed in said fuel cells.

17. A fuel cell assembly comprising:
a pair of terminal plates, one of said terminal plates disposed at each end of the fuel cell assembly;
a pair of end fuel cells disposed between said terminal plates, each of said end fuel cells having a cathode disposed therein;
a plurality of fuel cells arranged in a stack and disposed between said end fuel cells, each of said fuel cells having a cathode disposed therein, wherein the cathodes disposed in said end fuel cells have a thickness of at least about 1.5 times an average thickness of the cathodes disposed in said fuel cells; and
an insulating layer disposed between said fuel cells and at least one of said terminal plates to provide a thermal barrier therebetween.

18. The fuel cell assembly of claim 17, wherein each of said end fuel cells and said fuel cells includes an electrolyte membrane disposed therein, the electrolyte membranes disposed in said end fuel cells having a thickness of at least about 1.5 times an average thickness of the membranes disposed in said fuel cells.

19. The fuel cell assembly of claim 1, further comprising a coolant flow through the fuel cell assembly configured to compensate for thermal energy generated by a protonic resistance of the electrolyte membranes disposed in said first end fuel cell and said second end fuel cell and an electrical resistance of said insulating layer.

* * * * *